May 30, 1933.  L. D. KAY  1,911,757

MOLDING APPARATUS AND METHOD

Filed Dec. 12, 1931  2 Sheets-Sheet 1

Inventor
Lloyd D. Kay

By Lyon+Lyon

Attorneys

May 30, 1933.   L. D. KAY   1,911,757
MOLDING APPARATUS AND METHOD
Filed Dec. 12, 1931   2 Sheets-Sheet 2
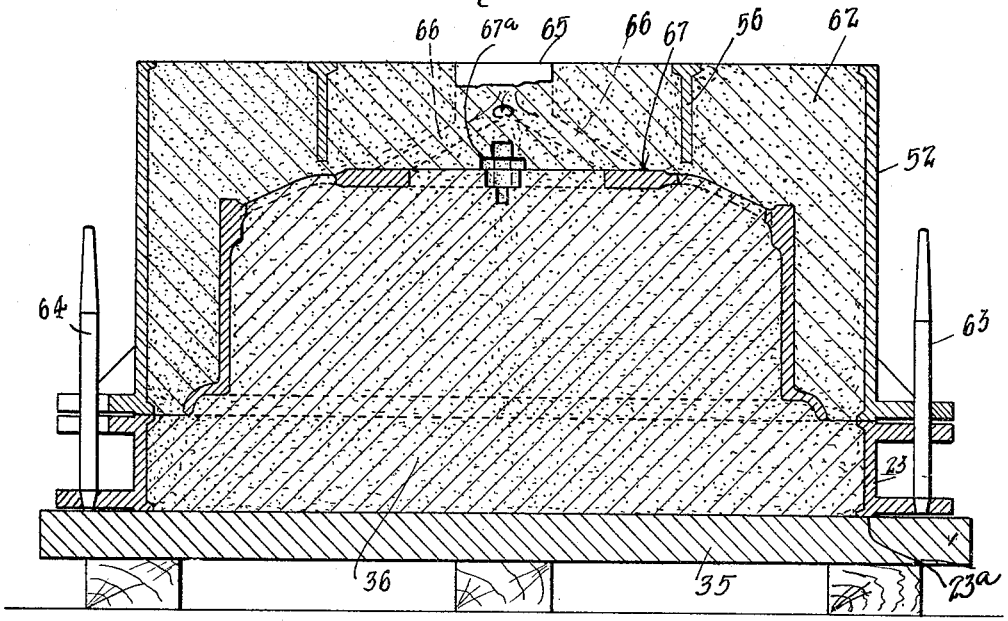
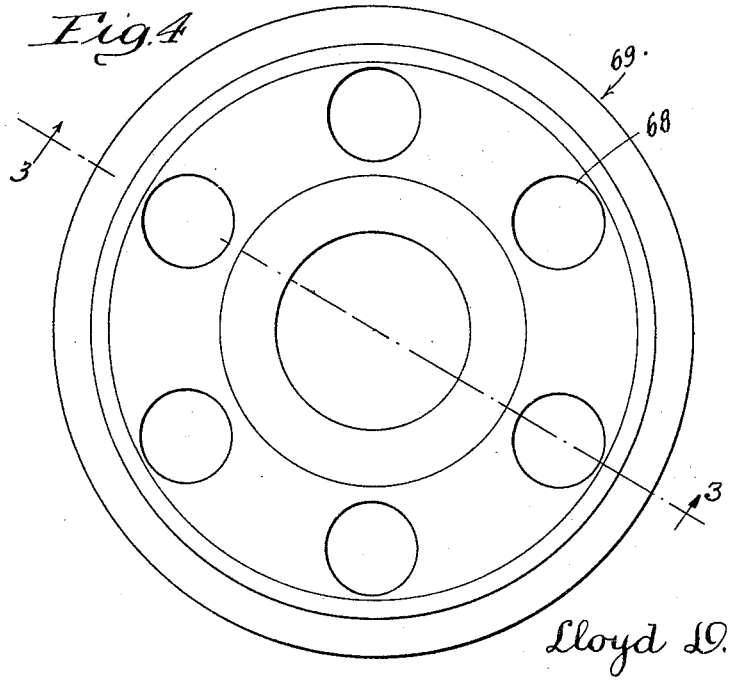
Inventor
Lloyd D. Kay
By Lyon & Lyon
Attorneys Patented May 30, 1933

1,911,757

UNITED STATES PATENT OFFICE

LLOYD D. KAY, OF LOS ANGELES, CALIFORNIA

MOLDING APPARATUS AND METHOD

Application filed December 12, 1931. Serial No. 580,577.

This invention relates to molding, and while features of the invention may be employed for molding articles of different kinds, it is intended particularly for use in the molding of round articles such as wheels.

The invention is particularly useful in the construction of molds for molding truck wheels. Such wheels are designed with considerable variation at the hubs and at the rims.

The general object of the invention is to provide simple apparatus and a simple method for molding wheels or similar articles; also to provide simple molding apparatus which can be rammed up with facility and which will be capable of producing molded articles such as wheels which will be relatively uniform in their dimensions.

A further object of the invention is to provide molding apparatus which is adapted for enabling the shape and dimensions of the articles cast, to be varied to suit special designs or dimensions and without the necessity for employing a great number of patterns.

As applied to the type of wheel having a disc and rim, one of the objects of the invention is to provide simple molding apparatus enabling the shape of the disc or spokes of the wheel to be readily varied as may be desired.

Further objects of the invention will appear hereinafter.

The invention consists of novel parts and combinations of parts to be described hereinafter, all of which contribute to produce an efficient molding apparatus and method.

The invention also consists in the novel method to be described hereinafter.

A preferred embodiment of the invention is described in the following specification, while the broad scope of the invention is pointed out in the appended claims.

In the drawings—

Figure 3 is a vertical section taken through the completed mold with the drag and cope held together, and illustrates the molding space in the mold filled with a cast metal; this view shows, in section, the molding board which supports the complete flask, and is taken through the flask in a direction indicated by the line 3—3 on Figure 4;

Figure 4 is a plan of the wheel removed from the mold.

Figure 2:
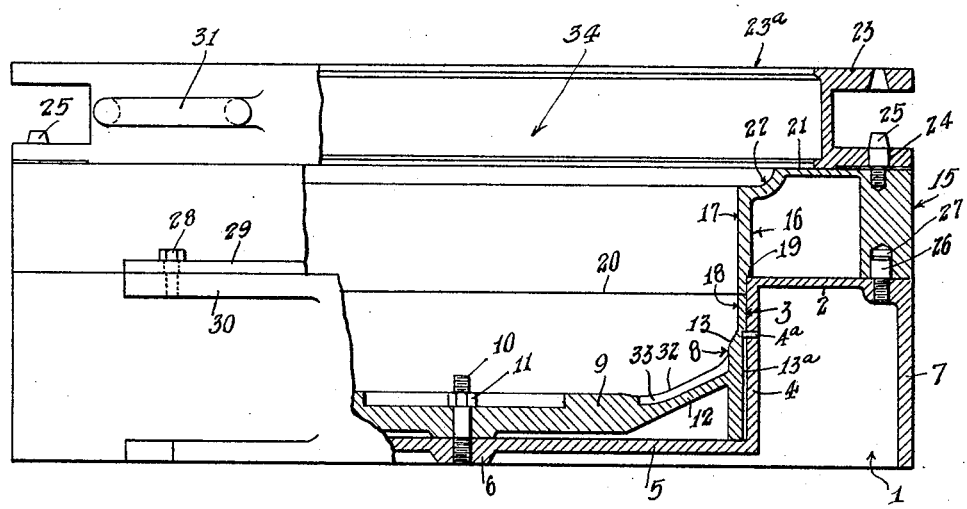
Figure 2 is a view similar to Figure 1, but illustrating the pattern and flask ready for ramming up the drag.

Referring more particularly to the parts, especially to Figure 2, 1 indicates the body of the drag pattern which may be designated as the master drag pattern, because this part is employed in molding any of the different shapes of wheels, or other articles to be molded.

This master drag pattern has an annular upper plate 2, in the center of which an opening 3 is formed, which opening is defined by a cylindrical wall 4, the lower edge of which is integral with the bottom 5, said bottom preferably being formed with the central boss 6, the lower face of which is flush with the lower edge of a downwardly projecting integral apron 7 that extends down from the margin of the upper plate 2.

Within the central opening 3, I place a liner pattern 8 which is preferably built up of interchangeable parts so that any shape of disc may be cast with any desired width of rim. In the present instance, the liner pattern comprises a bottom plate 9 which I call a drag adapter disc. This plate is connected at its center to the boss 6 by any suitable removable means, for example: the stud 10 with a removable nut 11, which can be taken off to enable discs 9 of different form or dimensions to be put in place at the bottom of the opening 3. The adapter disc 9 illustrated is formed with a substantially conical outer portion 12 at the margin of which an upwardly projecting flange 13 is formed, the outer face of which lies against the inner face of the wall 4 of the master pattern.

On the upper side of the plate 2, I provide an interchangeable drag ring 15 which forms part of the liner, that is to say, it has an inner annular or cylindrical wall 16, the inner face 17 of which cooperates with the inner face 18 of the flange 13 so as to form the inner face of the pattern against which the sand is to be rammed. In the present instance, the face 17 and the inner face 18 of the flange are struck on the same radius in order to produce a wheel of plain cylindrical form. The wall 16 is preferably formed with an annular shoulder 19 that seats on the edge of the opening 3, and the lower end of the wall 16 extends downwardly so that its lower end forms a joint 20 where it abuts the upper edge of the flange 13. This shoulder operates to center the interchangeable drag ring 15, and insures that the faces 17 and 18 will be in alinement with each other.

If the wheel is to be a truck wheel to carry a tire rim, or two tire rims, the upper face 21 of the interchangeable drag ring is provided with a counterbore or recess 22 of a larger diameter than the central opening of this drag ring. This forms the flange on the wheel.

On the upper face of the drag ring 15, I mount a drag flask 23 which is simply an open ring provided with a plurality of dowel openings 24 to receive dowels 25 which are mounted in the upper face of the interchangeable drag ring 15.

If desired, an alining dowel 26 may be provided on the upper face of the plate 2 to be received in a dowel opening 27 in the drag ring 15. If desired, another dowel in the form of a removable bolt 28 may be provided by another point and passing through a bottom flange 29 on the drag ring so that its tip extends into a flange 30 projecting from the apron 7 of the master drag pattern.

The side of the drag flask 23 may be provided with a plurality of handholds 31 to facilitate handling the same.

If the wheel to be cast is to have openings in its disc, the upper face 32 of the disc 9 will have a plurality of recesses 33 which may be given any shape desired. In the present instance, these recesses are of circular form so as to produce circular openings in the finished wheel (see Figure 4).

When these parts have been assembled, as shown in Figure 2, it will be evident that a large ramming chamber 34 is formed, the lower portion of which is formed in the parts of the pattern and the upper portion of which is formed within the ring 23. In using the flask, the ramming chamber 34 is rammed full of molding sand and scraped off flush with the upper face 23a of the drag flask 23.

I then place a molding board 35 (see Figure 3) on the upper face of the drag flask 23 and invert all of the parts so that the flask 23 and other parts will be supported on the molding board. Then I lift off the master drag pattern 1, and the interchangeable drag ring 15, leaving the flask 23 resting on the molding board and holding the rammed sand 36 (see Figure 3) in position so that its upper portion will project upwardly into the cope flask when it is in place over it.

The construction and manner of using the cope of the flask will now be described.

Figure 1:
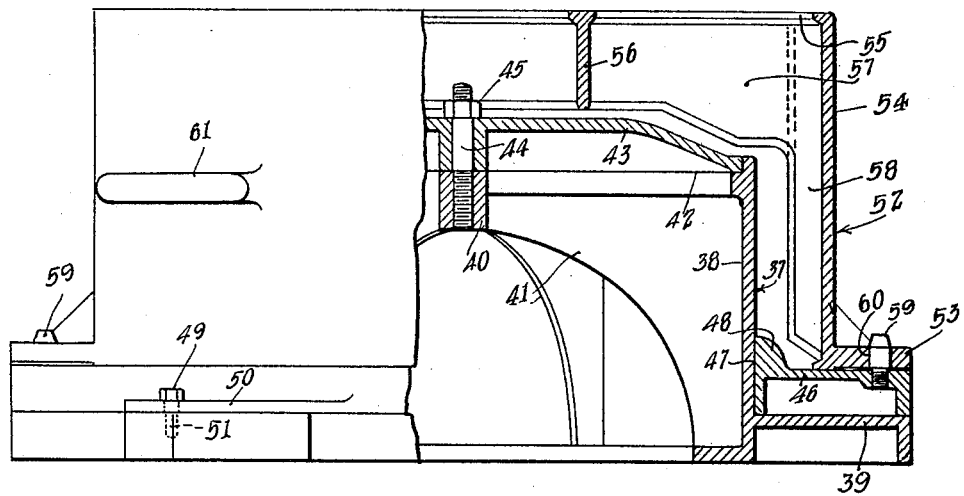
Figure 1 is a side elevation, and shown partly in section illustrating the pattern for use with the cope of the molding flask, and showing these parts assembled ready to be rammed with sand.

Referring to Figure 1, I provide a cope master pattern 37 which has a cylindrical wall 38 from which a base 39 projects outwardly at its lower edge. This master pattern is preferably formed with a central hub 40 connected by radial webs 41 with the wall 38. Cooperating with this master pattern 37, I provide an adapter disc to cooperate with the adapter disc 9 to form the molding space for the disc of the cast wheel. In the present instance, the wheel has its disc at one end of the rim and in this case, I provide the upper end of the wall 38 with an annular shoulder 42 to support an adapter disc 43 which is attached to the hub 40 by removable means, for example, a stud 44 with a nut 45.

Seating on the base 39, I provide an interchangeable cope ring 46 which has a central opening 47 of the proper diameter to fit neatly over the cylindrical wall 38 of the master pattern, and at its inner edge is provided an annular boss 48 which will cooperate with the recess 22 (see Figure 2) to form a concavo-convex flange for the cast wheel, and which will be located at one end of the wheel rim.

In order to insure proper alinement of the ring 46 where such alinement is important, I provide a removable dowel in the form of a bolt 49 received in a flange 50 on the ring, and this bolt has a dowel tip 51 which extends down into the base 39.

On the upper face of the base 46, I seat a cope 52 which has a base flange 53 and an upwardly extending cylindrical wall 54 forming a large central opening 55 through which sand can be rammed downwardly against the upper face of the adapter disc 43 and against the outer side of the cylindrical wall 38 and the annular boss 48 and the upper face of the base 46. If the mold is a large one, the cope should be provided with a grid for retaining the sand and comprising cross bars 56 and 57 extending at right angles to each other. These bars have extensions such as the extensions 58 that run down the inner faces of the side wall 54 of the cope so as to assist in holding the rammed sand at the sides.

The cope if centered in position by means of dowels 59 received in dowel openings 60 formed in the flanges 53.

When the parts are all in position indicated in Figure 1, the cope is rammed up with molding sand thrown into the cope from above, and after the ramming is completed, cope 52 is lifted off carefully by means of handholds 61 similar to the handholds 31. The cope 52 carrying its rammed sand 62 is then applied over the drag 23 as indicated in Figure 3 and is properly centered on the drag by means of dowel spikes 63 and 64. In ramming sand 62, a suitable central gate 65 is formed with branches 66 leading over to the mold space 67 at the nave of the wheel.

In ramming the cope and drag, the inner ends of the studs 44 and 10 will form small recesses 67a in the sand, but these recesses (see Figure 3) will not interfere with the molding of a wheel which has an opening at the center. If the wheel or other article to be molded must have metal at its center, then these studs 10 and 44 will have to be constructed so as not to have any part projecting into the ramming chamber in which the sand is rammed up.

When the cope is placed over the drag, as illustrated in Figure 3, the sand which has filled the recesses 33 will touch the lower face of the rammed sand 62 in the cope so as to form cores to produce the openings 68 of the completed wheel 69 illustrated in Figure 4.

It will be evident that in using this apparatus, if a wheel is to be cast having a rim of less or greater width than can be produced with patterns illustrated in Figure 2, the ring 15 would be removed and another ring substituted of a desired depth. Likewise, if it is desired to change the form or configuration of the disc portion of the cast wheel, the adapter disc 9 can be removed together with its corresponding adapter disc 43 of the cope and other adapter discs substituted. In this way, by using interchangeable liner parts a great variety of wheels can be cast without necessitating carrying in stock a great number of patterns corresponding to the different designs which must be cast.

In order to center the adapter disc 9 where this is necessary, I provide the wall 4 with a guide pin 4a which is received in a slot 13a formed on the outer side of the flange 13 when the adapter disc 9 is let down into position on the bottom 5 of the master drag pattern.

It is understood that the embodiment of the invention described herein is only one of the many embodiments this invention may take, and I do not wish to be limited in the practice of my invention, nor in my claims, to the particular embodiment set forth.

What I claim is:—

1. In molding apparatus, the combination of a master drag pattern having an opening extending into the same from above, a drag-adapter received in the said opening and having a substantially disc form body with a side flange projecting upwardly, an interchangeable drag-ring supported on the master drag pattern, having a wall with an inner face to aline with the inner face of the said flange, a drag-flask seating on the interchangeable drag-ring, said parts cooperating to enable the drag-flask to be rammed with sand flush with the upper face of the drag-flask and enabling all the parts after ramming, to be inverted on a molding board so that the master pattern carrying the adapter and the interchangeable drag-ring can be lifted off the flask.

2. In molding apparatus, the combination of a master cope pattern having a base with an upwardly projecting wall, an interchangeable cope ring having an opening fitting over the outer side of said wall, and resting on said base, an interchangeable adapter disc removably attached to the master pattern and cooperating with the said wall to form the bottom and inner side of a ramming chamber, and a cope flask seating over the said interchangeable cope ring, said parts cooperating to enable sand to be rammed down through the said flask so as to fill the same and the said ramming chamber, said cope flask being removable and having means enabling it to carry with it the rammed sand.

3. In a molding apparatus, the combination of a master drag-pattern having an opening extending into the same from above, an interchangeable drag-adapter removably received in said opening and having a substantially disc-form body with a side flange projecting upwardly, an interchangeable drag-ring supported on the master drag-pattern, having a wall with its inner face cooperating with the inner face of the said flange, a drag-flask seating on the interchangeable drag-ring, said parts cooperating to enable the drag-flask to be rammed with sand substantially flush with the upper face of the drag-flask and enabling all the parts after ramming, to be inverted on a molding board so that the master pattern carrying the adapter and the interchangeable drag-ring can be lifted off the flask, a master cope-pattern having a base with an upwardly projecting wall, an interchangeable cope-ring having an opening fitting over the outer side of said wall and resting on said base, a removable interchangeable adapter disc removably attached to the master cope-pattern and cooperating with the upwardly projecting wall of the cope-pattern to form the bottom and inner sides of a ramming chamber, and a cope-flask seating over the said interchangeable cope-ring, the said cope-pattern and the parts associated therewith cooperating to enable sand to be rammed down through the cope-flask so as to fill the same and the said ramming chamber, said cope-flask being removable and shaped to carry with it the rammed sand, and capable of being placed over the drag-flask and its associated parts to cooperate therewith to form a molding chamber.

4. In a molding apparatus for molding articles such as wheels, the combination of a master drag-pattern having a central opening extending into the same from above, a pattern liner received in the said opening and having a space within the same open from above to form a ramming chamber, a drag-flask removably mounted at the upper face of the liner and having an opening through the same enabling the sand to be rammed down into the first named ramming chamber to fill the same and to fill the opening in the drag-flask substantially flush with its upper face, said parts cooperating to enable the same to be inverted on a molding board so that the master pattern and the liner can be lifted from the flask.

5. In a molding apparatus for molding articles such as wheels, the combination of a master drag-pattern having a central opening extending into the same from above, a pattern liner received in the said opening and having a space within the same open from above to form a ramming chamber, said pattern liner including a bottom plate with a side flange projecting upwardly from the same at the side of said central opening and including an interchangeable drag-ring seating on the upper face of the master drag-pattern, with a cylindrical wall having an inner face to cooperate with the inner face of said flange to form a ramming chamber for the same, a drag-flask removably mounted at the upper face of the liner and having an opening through the same enabling the sand to be rammed down into the first named ramming chamber to fill the same and to fill the opening in the drag-flask substantially flush with its upper face, said parts cooperating to enable the same to be inverted on a molding board so that the master pattern and the liner can be lifted from the flask.

6. In a molding apparatus for molding articles such as wheels, the combination of a master drag-pattern having a central opening extending into the same from above, a pattern liner received in the said opening and having a space within the same open from above to form a ramming chamber, said pattern liner including a bottom plate with a side flange projecting upwardly from the same at the side of said central opening and including an interchangeable drag-ring seating on the upper face of the master drag-pattern, with a cylindrical wall having an inner face to cooperate with the inner face of said flange to form a ramming chamber for the same, said cylindrical wall abutting the end of said flange below the upper face of the master drag-pattern.

7. In a molding apparatus for molding articles such as wheels, the combination of a master drag pattern having a central opening extending into the same from above, a pattern liner received in the said opening and having a space within the same open from above to form a ramming chamber, said pattern liner including a bottom plate with a side flange projecting upwardly from the same at the side of said central opening and including an interchangeable drag-ring seating on the upper face of the master drag pattern, with a cylindrical wall having an inner face to cooperate with the inner face of said flange to form a ramming chamber for the same, said cylindrical wall having a shoulder seating on the upper face of the master drag-pattern and having its lower end projecting down into the said opening and abutting the end of said flange.

8. In molding apparatus for molding articles such as wheels, the combination of a master cope-pattern having a base with an upwardly projecting cylindrical wall and having a cope-adapter disc removably mounted on the master cope-pattern, an interchangeable cope-ring having an opening received over the said cylindrical wall, and a cope-flask seating over the said interchangeable cope-ring and over the said master cope-pattern and cooperating with the same to form a ramming chamber for ramming sand down through the said cope-flask, said flask and associated parts cooperating thereafter to enable the flask to be lifted from the other parts, carrying with it the rammed sand.

9. A method of forming sand mold elements for articles such as wheels, which consists in supporting a drag mold having a ramming space open above, seating a drag-flask on the upper face of the drag mold, ramming sand down into the ramming space so as to fill the interior of the drag flask and the drag in one ramming operation, applying a molding board to the upper face of the flask and inverting the drag mold and the flask so that the flask and sand will be supported on the molding board and the rammed sand project up above the flask, and then lifting the drag mold off of the flask.

10. A method of forming sand mold elements for articles such as wheels, which consists in supporting a cope-pattern, placing a cope-flask over the said cope-pattern so as to form a ramming space between the pattern and the flask, ramming the said ramming space and the interior of the flask with sand, lifting the flask off of the pattern, separately supporting a drag-mold having a ramming space open above, seating a drag-flask on the upper face of the drag-flask, ramming sand into the latter ramming space so as to fill the same and the interior of the drag, applying a molding board to the upper face of the drag flask, and inverting the pattern and the flask so that the flask and sand will be supported on the molding board, lifting the drag-pattern off of the flask, and then setting the cope-flask down over the drag-flask.

Signed at Los Angeles, California, this 4th day of December, 1931.

LLOYD D. KAY.